United States Patent Office 3,197,500
Patented July 27, 1965

3,197,500
ESTERS OF 2,2,4-TRIMETHYL-3-KETOPENTANOIC ACID WITH MONOHYDRIC HYDROCARBON ALCOHOLS
Garry C. Kitchens and Thomas F. Wood, Wayne, N.J., assignors to The Givaudan Corporation, New York, N.Y., a corporation of New Jersey
No Drawing. Filed Oct. 31, 1960, Ser. No. 65,937
7 Claims. (Cl. 260—483)

This invention relates to an improved process for making keto esters and to certain novel keto esters made thereby.

The methyl and ethyl esters of 2,2,-trimethyl-3-ketopentanoic acid are known, having been described in the scientific literature. However, the process for preparing these known esters is only of scientific interest and is devoid of commercial or practical significance, as the process is involved and the yields are low. Moreover, the esters have no known practical utility.

We have succeeded in devising a general method for making 2,2,4-trimethyl-3-ketopentanoates. Our method is technically simple and commercially feasible resulting in excellent yields of the desired esters. Moreover, we have found that certain of the novel keto esters we have prepared possess unexpected beneficial properties not possessed or suggested by the properties of the known esters.

In addition, we have found, surprisingly, that, unlike the known methyl and ethyl esters of 2,2,4-trimethyl-3-ketopentanoic acid, our novel ketopentanoates possess properties which make them valuable in perfumery. In this connection the novel esters not only possess desirable odors but their odor persistence qualities are such that the have practical utility in perfumes.

In accordance with our present invention, our process involves the reaction of 2,2,4,4-tetramethyl-1,3 cyclobutanedione with alcohols, ROH, in the presence of strong alkaline material, to yield keto esters. The reaction may be represented as follows:

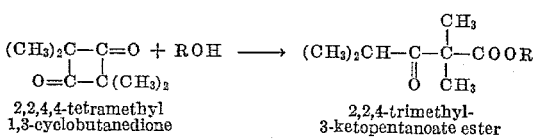

2,2,4,4-tetramethyl 1,3-cyclobutanedione → 2,2,4-trimethyl-3-ketopentanoate ester wherein R may be a $C_3$ to $C_{10}$ branched chain alkyl group, a $C_4$ to $C_{10}$ straight chain alkyl group, a $C_3$ to $C_{10}$ mono-or-di-unsaturated aliphatic hydrocarbon group, a phenyl group, a phenyl group substituted with a lower alkyl group, a lower alkyl group substituted with a phenyl group, or a lower alkenyl group substituted with a phenyl group.

If desired, especially where higher molecular weight alcohols, i.e., those having at least 8 carbon atoms, or where sterically-hindered tertiary alcohols, such as linalool, are used the corresponding alkali metal alcoholates may be used in place of the alcohol, no other catalyst being needed to obtain good yields in short reaction periods.

The alkali metal alcoholates may be designated as ROM, where M is an alkali metal.

The alcohols, ROH, which may be used in accordance with this invention, are those wherein R may be an alkyl, aryl or aralkyl hydrocarbon radical, which may be primary, secondary or tertiary. Examples of such alcohols are those wherein R is a saturated hydrocarbon group such as isopropyl 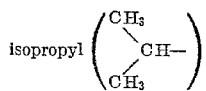

n-butyl($CH_3CH_2CH_2CH_2$)

tert. butyl 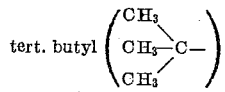

3,7 dimethyl octanyl 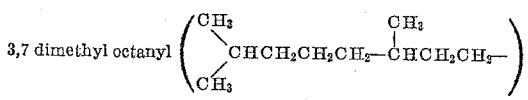

the hydrocarbon groups from unsaturated primary alcohols such as citronellyl

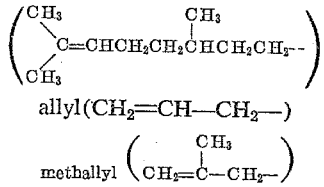

allyl($CH_2=CH—CH_2—$)

methallyl 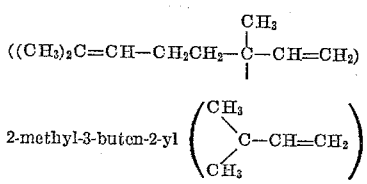

the hydrocarbon groups from unsaturated teritary alcohols such as linalyl $((CH_3)_2C=CH—CH_2CH_2—\underset{CH_3}{\underset{|}{C}}—CH=CH_2)$ 2-methyl-3-buten-2-yl 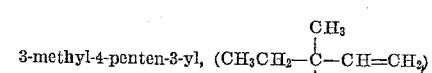

3-methyl-4-penten-3-yl, $(CH_3CH_2—\underset{CH_3}{\underset{|}{C}}—CH=CH_2)$ an unsaturated acetylenic group such as 2-methyl-3-butyn-2-yl, 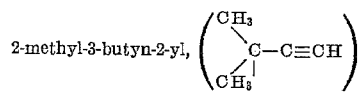

3-methyl-4-pentyn-3-yl, $(CH_3—CH_2—\underset{CH_3}{\underset{|}{C}}—C≡CH)$ 3-methyl-1-nonyn-3-yl, $(C_6H_{13}\underset{CH_3}{\underset{|}{C}}—C≡CH)$ an aryl group such as phenyl or p-cresyl; a saturated aralkyl group such as benzyl or phenylethyl; and an unsaturated aralkyl group such as cinnamyl

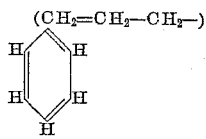

The catalysts employed in accordance with this invention are strong bases. Preferred among such catalysts are alkali metal bases and metal alcoholates, particularly the latter, as highest yields with minimum by-products are obtained when they are used. Specific examples of operable catalysts include sodium hydroxide, potassium hydroxide, sodium alcoholates and potassium alcoholates such as methylates, ethylates, propylates, butylates, linalylates, citronellylates, allylates, methallylates, phenylethylates, p-cresylates, benzylates and materials capable of producing these metal alcoholates from the corresponding alcohols such as sodium and potassium metals, sodium and potassium amides and hydrides.

If desired, non-reactive solvents may be employed during the reaction. Diethyl ether and hydrocarbons, such as benzene or toluene, are satisfactory.

While anhydrous conditions are preferred, the reaction may be conducted in the presence of small amount of water, if desired.

The reaction can be carried out with or without agitation, the latter being preferred, and at atmospheric or superatmospheric pressures, the former pressures being preferred.

The proportions of the materials employed in accordance with our invention may be varied over wide limits. Amount of the alcohol ROH, from about equimolecular amounts upwards, as compared with the cyclobutanedione employed my be used. Advantageously, from about 1 to about 15 mols of alcohol per mol of cyclobutanedione are used. With respect to the alkaline material employed, amounts as low as about 0.5 percent, by weight, based on the weight of cyclobutanedione used, may be employed. If desired, stoichiometric amounts of the alkaline material, on the same basis, may be used. It is preferred to use from about 0.5 percent to about 15 percent, by weight, of the alkaline catalyst, the amount being based on the amount of the cyclobutanedione employed.

In general, temperatures under which the process of this reaction may be conducted vary over wide limits. While the reaction may be conducted at ambient room temperature (about 25° C.), or even lower, e.g. at 10° C. it is preferred to operate at elevated temperatures, temperatures within the range from about 50° C. to about 70° C. being preferred. It will also be understood that as the molecular weight of the alcohol, ROH, increases, the temperature at which the reaction may be conducted increases.

The time required to complete the reaction of this invention will vary over wide limits, depending on the reactants, catalysts, proportions and temperature employed. Generally speaking, the time required is of the order of about ¼ to about 24 hours.

The invention is further illustrated by the following examples, without, however, limiting the same to them.

EXAMPLE I

*Isopropyl 2,2,4-trimethyl-3-ketopentanoate*

Into an agitated mixture of 35 g. of isopropyl alcohol, 0.5 g. solid sodium methylate and 10 ml. of benzene was added 70 g. of 2,2,4,4-tetramethyl-1,3-cyclobutanedione at 20° C. over a 15 minute period. The agitation was continued at 20–25° C. for 2 hrs. while 1.5 g. of sodium methylate, in three portions of 0.5 g. every ½ hr., were added.

The batch was neutralized by the addition of acetic acid and then 50 ml. of water added. The oil layer was separated and washed twice with 50 ml. of water. The benzene was removed under slightly reduced pressure. The residual liquid, 97 g., was vacuum distilled to yield as the main fraction 94 g. a colorless liquid, B.P. 68–69° C. (5 mm.), $n_D^{20}$ 1.4221, saponification value (24 hrs.) 269.3.

EXAMPLE II

*Citronellyl 2,2,4-trimethyl-3-ketopentanoate*

Into an agitated mixture of 70 g. 2,2,4,4-tetramethyl-1,3-cyclobutanedione and 50 ml. of benzene was added a solution of 2 g. of solid sodium methylate in 78.1 g. of citronellol over a ½ hr. period at 40° C. The batch was agitated ½ hour at 40° C. and ½ g. of solid sodium methylate added and agitated an additional ½ hr. at 35° C. The reaction mixture was acidified to phenolphthalein with acetic acid and 50 ml. of water added.

The oil layer was separated and washed twice using 50 ml. portions of water. The benzene was removed under slightly reduced pressure. The residual liquid, 149 g., was vacuum distilled and yielded as the main fraction 123 g. of the desired product, a colorless liquid, B.P. 115–118° C. (0.5 mm.), $n_D^{20}$ 1.4506, saponification value (24 hrs.) 197.2.

*Analysis.*—Calcd. for $C_{18}H_{32}O_3$: C, 72,93; H, 10.88. Found: C, 73.00; H, 10.75.

EXAMPLE III

*Phenylethyl 2,2,4-trimethyl-3-ketopentanoate*

Into an agitated mixture containing 70 g. 2,2,4,4-tetramethyl-1,3-cyclobutanedione and 50 ml. of benzene was added a solution of 64 g. phenylethyl alcohol and 2.0 g. sodium methylate at 35° C. over a ½ hr. period. The batch was agitated 2 hrs. at 35° C. and neutralized to phenolphthalein with acetic acid. Fifty ml. of water was added and the oil layer separated and washed twice with 50 ml. of water.

The benzene was removed by distillation under slightly reduced pressure. The residual oil, 132 g., was vacuum distilled to yield 39.5 g. of a fraction, B.P. 77–106° C. (0.5 mm.) consisting of a mixture of phenylethyl alcohol, and phenylethyl isobutyrate and phenylethyl 2,2,4-trimethyl-3-keto-pentanoate as the main fraction 88 g., B.P. 114–118° C. (0.5 mm.), $n_D^{20}$ 1.4886, saponification value 224.2 (4 hrs.), 232.9 (24 hrs.). The phenylethyl pentanoate had a sweet flowing odor of the peony type.

*Analysis.*—Calcd. for $C_{16}H_{22}O_3$, C. 73.25; H, 8.45. Found: C, 73.17; H, 8.26.

EXAMPLE IV

*4-methyl-2-pentanyl-2,2,4-trimethyl-3-ketopentanoate*

Into an agitated mixture containing 70 g. 2,2,4,4-tetramethyl-1,3-cyclobutanedione and 50 ml. of benzene was added a solution of 55 g. methyl isobutyl carbinol and 2.0 g. of solid sodium methylate over a ½ hr. period at 35° C. The batch was agitated ½ hr. with cooling. Then there was added 0.5 g. more of powdered sodium methylate catalyst and stirring continued for 1 hr. at 35°. Finally there was added portionwise an additional 0.5 g. of the catalyst, 0.25 g. immediately and the remainder after a 1 hour interval, while stirring at 35° C. Stirring at 35° was continued for 1 hr. longer. In this manner the reaction was completed over a 4 hr. period, using altogether 3 g. sodium methylate catalyst.

The reaction mixture was neutralized with acetic acid using phenolphthalein indicator and 50 ml. of $H_2O$ was added. The oil layer was separated and washed twice with 50 ml. portions of water. The benzene was removed under slightly reduced pressure. The residual oil, 112 g., was vacuum distilled to yield as the main fraction, the desired ester 92.5 g., B.P. 82–83° C. (0.5 mm.), $n_D^{20}$ 1.4299, saponification value (24 hrs.) 237.7, and having a smoky wood odor like patchouly.

*Analysis.*—Calcd. for $C_{14}H_{26}O_3$: C, 69.37; H, 10.82. Found: C, 69.2; H, 10.54.

EXAMPLE V

*2-methyl-3-buten-2-yl-2,2,4-trimethyl-3-ketopentanoate*

Into a reaction flask equipped with an agitator, thermometer, a solids-feeding funnel and a reflux type packed distillation column was charged 100 g. of 2-methyl-3-buten-2-ol. Fifty-four g. of solid sodium methylate was fed in over a 15 minute period keeping the temperature below 50° C. by cooling. Two hundred ml. of benzene was added and the reaction mixture was refluxed for 20 hrs. while removing 100 g. of distillate which boiled below 65° C. Towards the end of the reflux period the vapor temperature rose and approached 80° C.

The reaction mixture (sodium salt of 2-methyl-3-buten-2-ol) was cooled to 50° C. and 140 g. of 2,2,4,4-tetramethyl-1,3-cyclobutanedione was added over ½ hr. period with cooling. The batch was agitated 2 hrs. at 50° C. and cooled to 20° C. The batch was neutralized by adding with cooling approximately 60 g. of acetic acid. Three hundred ml. of water was slowly added and the benzene-oil layer separated.

The benzene-oil layer was washed neutral with water and the benzene was removed by distillation under slightly reduced pressure. The residual oil, 211 g., was vacuum distilled yielding 26 g., B.P. 20–62° C. (1 mm.), consisting of mainly di-isopropyl ketone, 2-methyl-3-buten-2-yl isobutyrate and a trace of 2-methyl-3-buten-2-yl 2,2,4-trimethyl-3-ketopentanoate, a main fraction, 168 g., B.P. 62–68° C. (1 mm.), $n_D^{20}$ 1.4363, which was the desired product, 2-methyl-3-buten-2-yl 2,2,4-trimethyl-3-ketopentanoate, and which possessed a fine cedar odor.

EXAMPLE VI

*Linalyl 2,2,4-trimethyl-3-ketopentanoate*

Into the apparatus as described in Example VI was charged 200 g. of linalool and 200 ml. of benzene. Fifty-four grams of solid sodium methylate was fed in with agitation and cooling. The reaction mixture was agitated and refluxed for 22 hours while removing 90 g. of distillate boiling below 65° C. Towards the end of the reflux period the vapor temperature rose and approached 80° C.

The batch was cooled to 50° C. and 140 g. of 2,2,4,4-tetramethyl-1,3-cyclobutanedione was fed in at 50° C., with cooling over a ½ hr. period. The reaction mixture was agitated an additional 4 hrs. at 50° C. The batch was cooled to 25° C. and neutralized by slowly adding 60 g. of acetic acid with cooling. Two hundred milliliters of water were added.

The benzene-oil layer was separated and washed neutral with water. The benzene was removed by distillation under slightly reduced pressure leaving a residual liquid of 314 g. This residual liquid was vacuum-distilled to yield 63 g. of a fraction, B.P. 23–115° C. (0.5 mm.) consisting of linalool, linalyl isobutyrate, linalyl 2,2,4-trimethyl-3-ketopentanoate and traces of di-isopropyl ketone and a main fraction, 228 g., B.P. 115–119° C. (0.5 mm.) $n_D^{20}$ 1.4590, sp. gr. 25/25° C. 0.9339, saponification value 64.8 (4 hrs.), 194.9 (24 hrs.). The desired product has a lavender fragrance of the jasmine type.

*Analysis.*—Calcd. for $C_{18}H_{30}O_3$: C, 73.42; H, 10.27. Found: C, 73.66; H, 9.86.

EXAMPLE VII

*p-Cresyl 2,2,4-trimethyl-3-ketopentanoate*

Into an agitated mixture containing 70 g. of 2,2,4,4-tetramethyl-1,3-cyclobutanedione and 50 ml. of benzene was added a solution of 2 g. sodium methylate and 55 g. para-cresol at 40° C. over a 20 minute period. The batch was agitated 2 hrs. at 40° C. and 0.5 g. sodium methylate added. The temperature was raised to 100° C. and agitated at 100° C. for 12 hrs. The reaction mixture was cooled to 20° C. and washed twice using 100 ml. portions of 5% sodium hydroxide solution. Acidification of the caustic wash gave 6 g. of unreacted p-cresol.

The oil layer was washed neutral with water and the benzene removed by distillation under slightly reduced pressure. The residual oil was vacuum distilled to yield 31 g., B.P. 42–108° C. (0.5 mm.), of fractions containing di-isopropyl ketone, p-cresyl isobutyrate and p-cresyl 2,2,4-trimethyl-3-ketopentanoate as the main fraction 82 g., B.P. 108–112° C. (0.5 mm.), $n_D^{20}$ 1.4897 saponification value (24 hrs.) 229.2.

*Analysis.*—Calcd. for $C_{15}H_{20}O_3$: C, 72.55; H, 8.11. Found: C, 72.49; H, 7.86.

EXAMPLE VIII

*2-methyl-3-buten-2-yl 2,2,4-trimethyl-3-ketopentanoate*

Into a 500 ml. flask equipped with an agitator, thermometer and a dropping funnel was charged 45 g. of 2,2,4,4-tetramethyl-1,3-cyclobutanedione and 50 ml. of benzene and warmed to 70° C. A warm (60° C.) solution of 100 g. 2-methyl-3-buten-2-ol and 2 g. of sodium methylate was added over ½ hr. period while agitating at 70° C. The batch was agitated ½ hr. at 70° C. and then a total of 1 g. of sodium methylate was added at 70° C. in ¼ g. portions every ½ hr. The reaction mixture was agitated ½ hr. longer at 70° C. and cooled to 25° C., neutralized to phenolphthalein using glacial acetic acid and washed four times using 50 ml. portions of water. The benzene and excess 2-methyl-3-buten-2-ol was removed by distillations under slightly reduced pressure and the residual liquid, 66 g. was vacuum distilled yielding 59.5 g. of 2-methyl-3-buten-2-yl 2,2,4-trimethyl-3-ketopentanoate, B.P. 70–72° C./0.5 mm., sp. gr. 25°/25° C. 0.9359, $n_D^{20}$ 1.4369 (yield 82% of theory).

*Analysis.*—Calcd. for $C_{13}H_{22}O_3$: C, 68.99; H, 9.81. Found: C, 68.74; H, 9.81.

EXAMPLE IX

*2-methyl-3-butyn-2-yl 2,2,4-trimethyl-3-ketopentanoate*

One gram of sodium was dissolved in 100 g. of 2-methyl-3-butyn-2-ol by agitation at room temperature (25° C.) over night.

Into a 500 ml. reaction flask equipped with an agitator, thermometer and a dropping funnel was charged: 70 g. 2,2,4,4-tetramethyl-1,3-cyclobutanedione, 50 ml. benzene. The charge was warmed to 70° C. The above prepared solution of sodium 2-methyl-3-butyn-2-ylate was fed in while agitating at 70° C. over a 40 minute period. The reaction mixture was agitated at 70° C. for 7 hrs. The batch was cooled to 25° C. and neutralized to phenolphthalein with glacial acetic acid and washed twice using 50 ml. portions of water. The benzene was removed under slightly reduced pressure and the residual liquid, 130 g., was vacuum distilled giving 21 g. 2-methyl-3-butyn-2-ol B.P. 23° C./6 mm. and 99.5 g. of solid 2-methyl-3-butyn-2-yl 2,2,4-trimethyl-3-ketopentanoate B.P. 96–101° C./6 mm. The product, 99.5 g. was crystallized from an equal wt. of hexane giving a total of 97 g., of 2-methyl-3-butyn-2-yl 2,2,4-trimethyl-3-ketopentanoate M.P. 47–49° C. The infrared absorption curve confirmed that the material was an acetylenic keto ester.

*Analysis.*—Calcd. for $C_{13}H_{20}O_3$: C, 69.61; H, 8.99. Found: C, 69.45; H, 8.86.

The yield was 87% of theory of the desired product, having a heliotropin-like note.

EXAMPLE X

*3-methyl-1-pentyn-3-yl 2,2,4-trimethyl-3-ketopentanoate*

Example IX was repeated using 1 g. sodium
100 g. 3-methyl-1-pentyn-3-ol
70 g. 2,3,4,4-tetramethyl-1,3-cyclobutanedione
50 ml. benzene There was obtained 165 g. of material which was vacuum-distilled to yield 66 g. B.P. 28–20° C./26 mm. consisting mainly of 3-methyl-1-pentyn-3-ol, 18 g. B.P. 105–112° C./5 mm. consisting mainly of 2,2,4,4-tetramethyl-1,3-cyclobutanedione, 69 g. B.P. 112° C./5 mm., sp. gr. 25/25 0.9522, $n_D^{20}$ 1.4445 of 3-methyl-1-pentyn-3-yl 2,2,4-trimethyl-3-ketopentanoate and 8 g. of residue. The infrared absorption curve confirmed that the material was an acetylenic keto ester.

*Analysis.*—Calcd. for $C_{14}H_{22}O_3$: C, 70.55; H, 9.31. Found: C, 70.32; H, 9.12.

The yield was 58% of theory of the desired product, having a walnut-like note.

EXAMPLE XI

*Methallyl 2,2,4-trimethyl-3-ketopentanoate*

Into a 500 ml. flask equipped with an agitator, thermometer, condenser and dropping funnel was charged 140 g. of 2,2,4,4-tetramethyl-1,3-cyclobutanedione and 50 ml. of benzene and warmed to 40° C. A solution containing 1 g. of solid sodium methylate and 73 g. of methallyl alcohol was fed in over a ½ hr. period while agitating and cooling at 40° C. The batch was agitated an additional 6 hrs. at 40° C. while adding a total of 1 g. of sodium methylate in portions of ¼ g. every 2 hrs.

The batch was neutralized to phenolphthalein with glacial acetic acid and 50 ml. water added. The batch was washed 2 x with 50 ml. of water and the benzene removed under reduced pressure. The residual oil was vacuum distilled and gave 10 g. of fractions, B.P. 28–78° C./3 mm., 189 g. of methallyl 2,2,4-trimethyl-3-ketopentanoate, B.P. 78–82° C./3 mm., $n_D^{20}$ 1.4401, saponification value (8 hrs.) 263.9.

*Analysis.*—Calcd. for $C_{12}H_{20}O_3$: C, 67.89; H, 9.49. Found: C, 67.71; H, 9.24. The yield of the desired product was 89% of theory. It had a bergamot-like fragrance.

EXAMPLE XII

*Allyl 2,2,4-trimethyl-3-ketopentanoate*

Example XI was repeated using 1 g. solid sodium methylate
59 g. allyl alcohol
140 g. 2,2,4,4-tetramethyl-1,3-cyclobutanedione
50 ml. benzene
1 g. solid sodium methylate.

There are obtained 4.5 g. of fractions B.P. 80–87° C./5 mm., 165 g. of allyl 2,2,4-trimethyl-3-ketopentanoate, B.P. 87–88° C./5 mm., $n_D^{20}$ 1.4370, saponification value (8 hrs.) 284.6.

*Analysis.*—Calcd. for $C_{11}H_{18}O_3$: C, 66.64; H, 9.15. Found: C, 66.23; H, 9.06. The yield was 83% of theory of the desired product, which had a mint-like note.

EXAMPLE XIII

*Linalyl 2,2,4-trimethyl-3-ketopentanoate*

Into a 500 ml. flask equipped with an agitator, thermometer, condenser and a dropping funnel was charged 70 g. 2,2,4,4-tetramethyl-1,3-cyclobutanedione and 50 ml. of benzene and warmed to 70° C. A warm (60° C.) solution of 158 g. linalool and 2 g. sodium methylate was fed in over ½ hr. period at 70° C. while agitating. The batch was agitated ½ hr. and a total of 1 g. of solid sodium methylate was added in ¼ g. portions every ½ hr. The batch was agitated an addition ½ hr. at 70° C. and cooled to 25° C. The batch was neutralized to phenolphthalein using glacial acetic acid and washed four times using 50 ml. portions of water. The benzene was removed by distillation under slightly reduced pressure and the residual liquid, 218 g. was vacuum distilled to give 85 g. of linalool B.P. 43–46° C./0.5 mm., 7 g. of fractions B.P. 46–118° C./0.5 mm., consisting of linalool, linalyl isobutyrate and linalyl 2,2,4-trimethyl-3-ketopentanoate and 117 g. linalyl 2,2,4-trimethyl-3-ketopentanoate B.P. 118° C./0.5 mm. Saponification value (24 hrs.) 192.5 sp. gr. 25/25° C. 0.9341, $n_D^{20}$ 1.4596. The yield was 79.5% of theory.

EXAMPLE XIV

*Tetrahydrolinalyl 2,2,4-trimethyl-3-ketopentanoate*

Into a 500 ml. flask equipped with an agitator, thermometer, condenser and a dropping funnel was charged 70 g. 2,2,4,4-tetramethyl-1,3-cyclobutanedione and 50 ml. of benzene and warmed to 70° C. A warm (60° C.) solution of 158 g. tetrahydrolinalool and 2 g. of sodium methylate was fed in while agitating at 70° C. over a ½ hr. period. The reaction mixture was agitated ½ hr. and a total of 1 g. of sodium methylate was added in ¼ g. portions every ½ hr. The batch was agitated ½ hr., cooled to 25° C. and neutralized to phenolphthalein using glacial acetic acid. The mixture was washed four times using 50 ml. portions of water. The benzene was removed by distillation under slight reduced pressure and the residual liquid, 207 g., was vacuum distilled to give 71 g. of tetrahydrolinalool B.P. 50–61° C./0.4 mm., 12 g. of fractions (B.P. 61–105° C./0.4 mm.) consisting of tetrahydrolinalool, tetrahydrolinalyl isobutyrate and tetrahydrolinalyl 2,2,4-trimethyl-3-ketopentanoate, and 116.5 g. tetrahydrolinalyl 2,2,6-trimethyl-3-ketopentanoate B.P. 105–110° C./0.4 mm., sp. gr. 25/25° C. 0.9100, $n_D^{20}$ 1.4430.

*Analysis.*—Calcd. for $C_{18}H_{34}O_3$: C, 72.48; H, 11.41. Found: C, 73.40; H, 11.30. Yield is 78% of theory.

While the invention has been described in detail it will be obvious to those skilled in the art, after understanding this invention, that various changes may be made therein without departing from the spirit or scope thereof. It is aimed, in the appended claims, to cover all such changes.

We claim:

1. Compounds represented by the following structural formula:

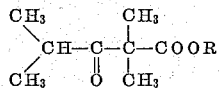

wherein R is a member selected from the group consisting of a $C_3$ to $C_{10}$ branched chain alkyl group, a $C_4$ to $C_{10}$ straight chain alkyl group, a $C_3$ to $C_{10}$ mono-unsaturated aliphatic hydrocarbon group, a $C_3$ to $C_{10}$ di-unsaturated aliphatic hydrocarbon group, a phenyl group, a phenyl group substituted with a lower alkyl group, a lower alkyl group substituted with a phenyl group, and a lower alkenyl group substituted with a phenyl group.

2. Isopropyl 2,2,4-trimethyl-3-ketopentanoate.
3. Phenylethyl 2,2,4-trimethyl-3-ketopentanoate.
4. 2-methyl-3-buten-2-yl 2,2,4-trimethyl-3-ketopentanoate.
5. Linalyl 2,2,4-trimethyl-3-ketopentanoate.
6. 2-methyl-3-butyn-2-yl 2,2,4-trimethyl-3-ketopentanoate.
7. Citronellyl 2,2,4-trimtehyl-3-ketopentanoate.

References Cited by the Examiner

UNITED STATES PATENTS 2,228,452   1/41   Gleason _____ 260—483
2,351,336   6/44   Pohl et al. _____ 260—483

OTHER REFERENCES

Cason et al.: J. Org. Chem. 22, 1326–32 (1957).
Eastman Chemical Products, Inc., technical data report TDR No. N-110, issued May 1960, pp. 3–5.
Erickson et al.: J. Am. Chem. Soc. 68, 492–496 (1946).
Mosher et al.: J. Am. Chem. Soc. 75, 3172–3176 (1953).
Reid et al.: J. Am. Chem. Soc. 75, 1655–1660 (1953).

LORRAINE A. WEINBERGER, *Primary Examiner.*

ABRAHAM H. WINKELSTEIN, DANIEL D. HORWITZ, LEON ZITVER, *Examiners.*

UNITED STATES PATENT OFFICE
CERTIFICATE OF CORRECTION

Patent No. 3,197,500                                        July 27, 1965

Garry C. Kitchens et al.

It is hereby certified that error appears in the above numbered patent requiring correction and that the said Letters Patent should read as corrected below.

Column 1, line 14, after "2,2," insert -- 4- --; line 34, for "the" read -- they --; column 2, line 1, for that portion of the formula reading "$CH_2$" read -- $CH_2$- --; lines 12 to 14, for that portion of the formula reading "$CH_2$--" read --$CH_2$- --; lines 26 to 29, the right-hand portion of the formula should appear as shown below instead of as in the patent:

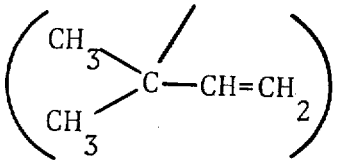

column 3, line 11, for "my" read -- may --; column 4, line 1, for "72,93" read -- 72.93 --; line 17, for "(0.5 mm.)" read -- (0.5 mm.), --; line 19, after "fraction" insert a comma; line 21, for "224.2 (4 hrs.), 232.9 (24 hrs.)" read -- (4 hrs.) 224.2, (24 hrs.) 232.9 --; line 22, for "flowing" read -- flowery --; line 47, for "ester" read -- ester, --; column 5, lines 30 and 33, for "(0.5 mm.)", each occurrence, read -- (0.5 mm.), --; line 35, for "64.8 (4 hrs.)" read -- (4 hrs.) 64.8 --; same line 35, for "194.9 (24 hrs.)" read -- (24 hrs.) 194.9 --; line 47, after "and" insert -- the batch --; column 6, line 3, for "was" read -- were --; lines 3 and 4, for "distillations" read -- distillation --; lines 30 and 33, after "-keptopentanoate", each occurrence, insert a comma; line 51, after "66 g." insert a comma; same line 51, for "28-20" read -- 28-30 --; line 52, after "18 g." insert a comma; line 53, after "5 mm." insert a comma; line 54, after "69 g." insert a comma; line 55, after "1.4445" insert a comma; column 7, line 21, after "fractions" insert a comma; same line 21, for "are" read -- was --; line 40, for "addition" read -- additional --; line 46, after "linalool" insert a comma; line 50, after "ate" insert a comma; column 8, line 7, after "tetrahydrolinalool" insert a comma; line 11, after "-3-ketopentanoate" insert a comma;

3,197,500 line 45, for "trimtehyl" read -- trimethyl --.

Signed and sealed this 15th day of August 1967.

(SEAL)
Attest:

EDWARD M. FLETCHER, JR.
Attesting Officer

EDWARD J. BRENNER
Commissioner of Patents